US011227022B2

(12) United States Patent
Bufe, III et al.

(10) Patent No.: US 11,227,022 B2
(45) Date of Patent: *Jan. 18, 2022

(54) METHOD FOR PERSONALIZED BREAKING NEWS FEED

(71) Applicant: International Business Machines Corporation, Armonk, NY (US)

(72) Inventors: John P. Bufe, III, Somerville, MA (US); Donna K. Byron, Petersham, MA (US); Patrick A. Wagstrom, Coventry, CT (US); Timothy P. Winkler, Clinton, MA (US)

(73) Assignee: International Business Machines Corporation, Armonk, NY (US)

( * ) Notice: Subject to any disclaimer, the term of this patent is extended or adjusted under 35 U.S.C. 154(b) by 21 days.

This patent is subject to a terminal disclaimer.

(21) Appl. No.: 16/716,583

(22) Filed: Dec. 17, 2019

(65) Prior Publication Data

US 2020/0125614 A1 Apr. 23, 2020

Related U.S. Application Data

(63) Continuation of application No. 14/944,356, filed on Nov. 18, 2015, now Pat. No. 10,546,028.

(51) Int. Cl.
*G06F 16/9535* (2019.01)
*G06F 16/901* (2019.01)
*G06F 16/2457* (2019.01)
*H04L 29/08* (2006.01)

(52) U.S. Cl.
CPC .... *G06F 16/9535* (2019.01); *G06F 16/24578* (2019.01); *G06F 16/9024* (2019.01); *H04L 67/22* (2013.01)

(58) Field of Classification Search
CPC .......... G06F 16/9535; G06F 16/24578; G06F 16/9024; H04L 67/22
See application file for complete search history.

(56) References Cited

U.S. PATENT DOCUMENTS

| 6,104,989 | A | 8/2000 | Kanevsky |
| 8,201,095 | B2 | 6/2012 | Dewar |
| 8,364,652 | B2 | 1/2013 | Vijayan |
| 8,412,848 | B2 | 4/2013 | Therrien |
| 8,605,092 | B2 | 12/2013 | Cao |
| 8,660,994 | B2 | 2/2014 | Slater |
| 8,670,978 | B2 | 3/2014 | Nagatomo |

(Continued)

FOREIGN PATENT DOCUMENTS

WO    2013113028 A1    8/2013

OTHER PUBLICATIONS

List of IBM Patents or Patent Applications Treated as Related, Filed Dec. 17, 2019, 2 pages.

*Primary Examiner* — Kannan Shanmugasundaram
(74) *Attorney, Agent, or Firm* — Gilbert Harmon, Jr.

(57) ABSTRACT

In an approach to personalizing a news feed, a computing device monitors a user accessing content. The computing device determines a personal knowledge graph for the user based on the accessed content. Responsive to receiving a new piece of content that the user has not accessed, the computing device determines a novelty score for the new piece of content based on the personal knowledge graph. The computing device filters the new piece of content based on the novelty score.

20 Claims, 5 Drawing Sheets

(56) References Cited

U.S. PATENT DOCUMENTS

| | | |
|---|---|---|
| 9,178,933 B1* | 11/2015 | Soland .................... H04L 67/18 |
| 2006/0041553 A1 | 2/2006 | Paczkowski |
| 2007/0100960 A1 | 5/2007 | Eichstaedt |
| 2011/0087647 A1* | 4/2011 | Signorini ............ G06F 16/9535 |
| | | 707/709 |
| 2011/0295612 A1* | 12/2011 | Donneau-Golencer ...................... |
| | | G06Q 30/02 |
| | | 705/1.1 |
| 2012/0109923 A1* | 5/2012 | Pasquero ............. G06F 16/904 |
| | | 707/706 |
| 2013/0036124 A1 | 2/2013 | Ambwani |
| 2013/0073983 A1 | 3/2013 | Rasmussen |
| 2014/0074863 A1* | 3/2014 | Walkingshaw ... G06F 16/24578 |
| | | 707/748 |
| 2014/0108393 A1 | 4/2014 | Angwin |
| 2014/0129331 A1 | 5/2014 | Spivack |
| 2014/0365504 A1 | 12/2014 | Franceschini |
| 2015/0169693 A1 | 6/2015 | Stekkelpak |
| 2017/0140052 A1 | 5/2017 | Bufe, III |

\* cited by examiner

METHOD FOR PERSONALIZED BREAKING NEWS FEED

TECHNICAL FIELD OF THE INVENTION

The present disclosure relates generally to the field of content filtering, and more particularly to deduplication and prioritization of content in a news feed.

BACKGROUND OF THE INVENTION

Given a developing storyline or event in the news, a reader may prefer to receive only the most relevant, up-to-date information from his or her content providers and avoid receiving redundant or duplicate information. Deduplication methods have developed as a means for curating personalized content streams, so that redundant facts and notifications are suppressed based on, for example, matching of character strings in incoming and previously presented content or a determination that a notification concerning a particular article has already been sent.

SUMMARY

According to an embodiment of the present invention, a computer-implemented method for personalized content filtering, the method comprising: determining, by the one or more computer processors, a first story arc based on a first piece of content; creating, by the one or more computer processors, a personal knowledge graph, of only the user, representing the user's individual knowledge related to the first story arc; determining, by the one or more computer processors, responsive to receiving a second piece of content, wherein the second piece of content has not been accessed by the user, a second story arc based on the second piece of content; determining, by the one or more computer processors, that the user has accessed the second piece of content; updating, by the one or more computer processors, the personal knowledge graph based on the second piece of content, wherein the first piece of content and the second piece of content share a third story arc, or determining a second personal knowledge graph based on the second story arc; determining, by the one or more computer processors, which information in the second piece of content the user has consumed; determining, by the one or more computer processors, a novelty score for the second piece of content based on the personal knowledge graph; and filtering, by the one or more computer processors, the second piece of content based on the novelty score.

According to an embodiment of the present invention, a computer program product for personalized content filtering, the computer program product comprising: one or more non-transitory computer readable storage media and program instructions stored on the one or more non-transitory computer readable storage media, the program instructions comprising: program instructions to determine a first story arc based on a first piece of content; program instructions to create a personal knowledge graph, of only the user, representing the user's individual knowledge related to the first story arc; program instructions to determine, responsive to receiving a second piece of content, wherein the second piece of content has not been accessed by the user, a second story arc based on the second piece of content; program instructions to determine that the user has accessed the second piece of content; program instructions to update the personal knowledge graph based on the second piece of content, wherein the first piece of content and the second piece of content share a third story arc, or determining a second personal knowledge graph based on the second story arc; program instructions to determine which information in the second piece of content the user has consumed; program instructions to determine a novelty score for the second piece of content based on the personal knowledge graph; program instructions to filter the second piece of content based on the personal knowledge graph; and program instructions to filter the second piece of content based on the novelty score.

According to an embodiment of the present invention, a computer system for personalized content filtering, the computer system comprising: one or more processors; one or more computer readable storage media; and program instructions stored on the one or more computer readable storage media for execution by at least one of the one or more processors, the program instructions comprising: program instructions to determine a first story arc based on a first piece of content; program instructions to create a personal knowledge graph, of only the user, representing the user's individual knowledge related to the first story arc; program instructions to determine, responsive to receiving a second piece of content, wherein the second piece of content has not been accessed by the user, a second story arc based on the second piece of content; program instructions to determine that the user has accessed the second piece of content; program instructions to update the personal knowledge graph based on the second piece of content, wherein the first piece of content and the second piece of content share a third story arc, or determining a second personal knowledge graph based on the second story arc; program instructions to determine which information in the second piece of content the user has consumed; program instructions to determine a novelty score for the second piece of content based on the personal knowledge graph; program instructions to filter the second piece of content based on the personal knowledge graph; and program instructions to filter the second piece of content based on the novelty score.

DETAILED DESCRIPTION

Existing deduplication methods can summarize or prioritize a news feed based on content-focused criteria, such as matched character strings in new and previously presented content. The present disclosure provides a method for deduplicating and prioritizing content based on user-knowledge criteria. Embodiments disclosed herein build a user-specific knowledge store that can be used to gauge the importance and novelty of incoming information and content sources to a particular user based on what the user has likely learned before. As used herein, the term "user" is not limited to contemplating a human user consuming content. The term "user" can also include, for example but without limitation, an automated agent that receives an influx of content elements and determines whether or not to read those content elements.

Figure 1:
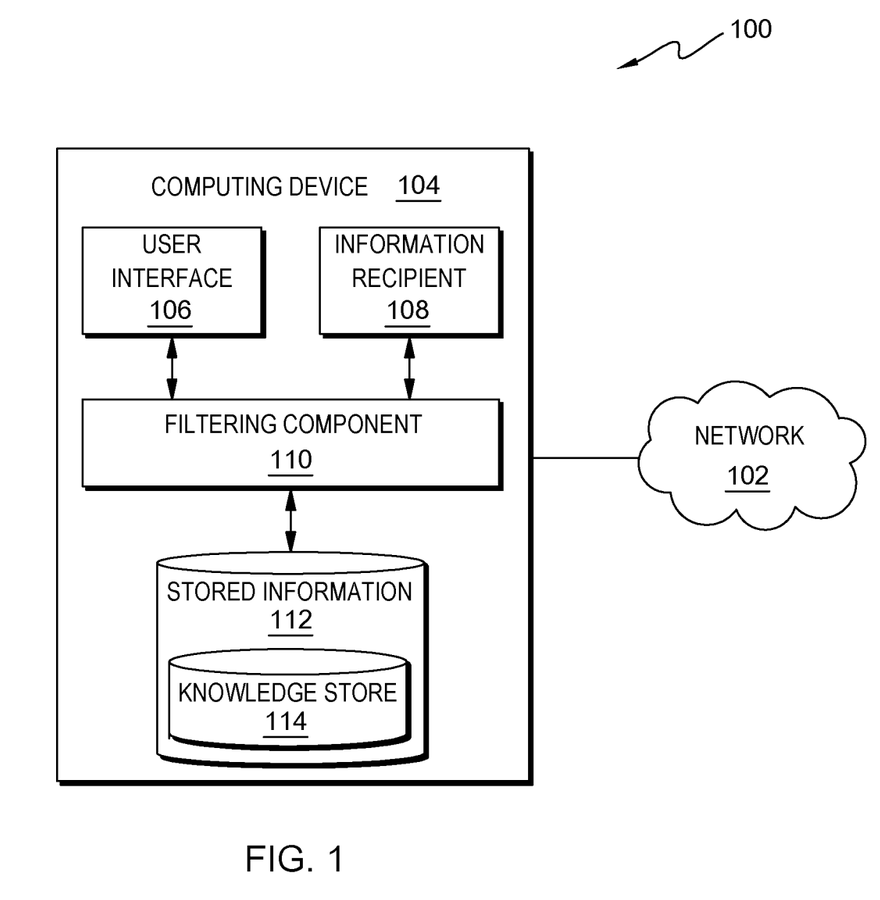
FIG. 1 is a functional block diagram of an exemplary computing environment, in accordance with an embodiment of the present invention.

FIG. 1 shows a block diagram of a computing environment 100, in accordance with an embodiment of the present invention. FIG. 1 is provided for the purposes of illustration and does not imply any limitations with regard to the environments in which different embodiments can be implemented. Many modifications to the depicted environment can be made by those skilled in the art without departing from the scope of the invention as recited in the claims.

Computing environment 100 includes computing device 104, which can be interconnected with other devices (not shown) over network 102. Network 102 can be, for example, a telecommunications network, a local area network (LAN), a wide area network (WAN), such as the Internet, or a combination of these, and can include wired, wireless, or fiber optic connections. In general, network 102 can be any combination of connections and protocols that will support communications between computing device 104 and other computing devices (not shown) within computing environment 100.

Computing device 104 can be any programmable electronic device capable of executing machine-readable instructions, communicating with other devices over network 102, and presenting information to a user via a user interface. Computing device 104 includes user interface 106, information recipient 108, filtering component 110, and stored information 112. Computing device 104 can include internal and external hardware components, as depicted and described in further detail with reference to FIG. 4.

User interface 106 provides an interface between a user of computing device 104 and computing device 104. User interface 106 can be, but is not limited to being, a graphical user interface (GUI) or a web user interface (WUI) and can display text, documents, web browser windows, user options, application interfaces, and instructions for operation, and can include the information (such as graphic, text, and sound) presented to a user and the control sequences the user employs to control information recipient 108 and/or filtering component 110.

Information recipient 108 is a software agent that receives content for consumption by a user of computing device 104. Information recipient 108 can, for example but without limitation, receive information from an individual content stream (e.g., social media micro-documents such as tweets or posts from Twitter or Facebook) or news articles from a news API.

Figure 2:
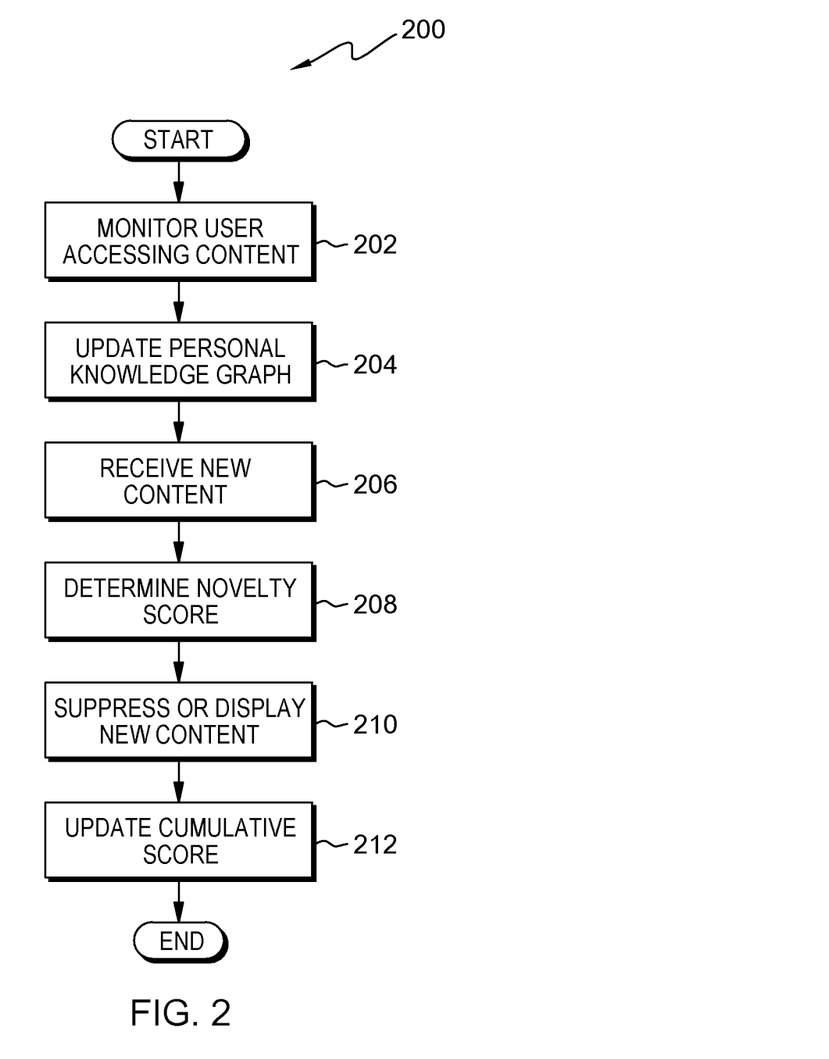
FIG. 2 is a flowchart depicting steps of a personalized content filtering method, in accordance with an embodiment of the present invention.

Filtering component 110 performs steps of a personalized content filtering method, as described herein with reference to FIG. 2. For example, filtering component 110 can interact with information recipient 108 to determine which information is displayed on user interface 106 and how the information is displayed.

Methods well known in the prior art allow filtering component 110 to identify that incoming information, also referred to herein as "content," which can be for example but without limitation a news article, a tweet, a video, or a podcast, is part of an identified story arc. A story arc is a topic that the user wishes to follow (e.g., a topic about which the user wishes to receive up-to-date information), such as but not limited to a breaking news story or a hashtag (e.g., "Election 2016," "Taylor Swift," "#QOTD"). A user can also designate, by interaction with user interface 106, a topic of interest that the user wishes to follow.

Filtering component 110 filters content received by information recipient 108 based on a user's personal knowledge history, as contained in stored information 112. Stored information 112 can be located entirely or in part on computing device 104, or stored information 112 can be located remotely on other devices (not shown), such as but not limited to a server, within computing environment 100. Stored information 112 comprises a user-specific knowledge store 114 and novelty score information, as described herein.

Knowledge store 114 includes one or more user-specific knowledge representations, also referred to herein as "knowledge graphs" or "personal knowledge graphs," which are based on the user's personal content consumption history. Natural language processing methods employed by, for example, IBM's Relationship Extraction Service (SIRE) can be used to generate a personal knowledge graph for a specific user and a specific story arc. Filtering component 110 extracts pieces of information such as but not limited to entities, relationships, and facts from content accessed by the user and populates the user's personal knowledge graph with one or more of the pieces of information. Entities are, for example but without limitation, institutions and public figures. Relationships are, for example but without limitation, connections between entities, such as but not limited to "born in" and "works for." Facts are, for example but without limitation, relationships between two or more entities. Illustrative examples of entities, relationships, and facts are described herein with reference to FIG. 3A-C.

Filtering component 110 can determine, based on the user having accessed content, that the user has consumed (learned) all of the information in that content, or filtering component 110 can employ additional mechanisms to determine which information the user has likely learned, and therefore which information can be added to the personal knowledge graph. For example but without limitation, filtering component 110 can determine that only information shown in the viewport on user interface 106 can be added to the personal knowledge graph; if computing device 104 is equipped to track eye movements, filtering component 110 can determine which information can be added to the personal knowledge graph based on eye tracking data; or filtering component 110 can determine that only information that the user selects by a manual choice mechanism, such as highlighting by interaction with user interface 106, can be added to the personal knowledge graph. Other exemplary but non-limiting factors can include the time that the user spent reading content, or the user's posting of a link to the content elsewhere online.

Filtering component 110 can also, for example, determine a confidence level with respect to a particular piece of information, wherein the confidence level reflects the fidelity of the mechanism (e.g., eye tracking, highlighting) employed to determine that the user has learned the piece of information.

The first time that a user accesses content relating to a particular story arc, filtering component 110 builds an initial personal knowledge graph based on the information extracted from the content. As the user accesses (consumes) additional content relating to the same story arc, which can include but is not limited to including clicking on a headline to read an article, scrolling through headlines or summaries, listening to a podcast, and clicking on a link to a video received in an email message, filtering component 110 updates the personal knowledge graph.

Filtering component 110 determines the novelty, which can be represented by a novelty score, of incoming content that the user has not accessed based on the personal knowledge graph. For example, filtering component 110 can determine that if the content contains a new entity; a new relationship; or a new fact (e.g., a relationship that is not represented in the personal knowledge graph between a pair of entities that is represented in the personal knowledge graph), such as an additional fact or a contradictory fact, the novelty score for that content increases. If, for example, filtering component 110 determines that the incoming content contains no new information, filtering component 110 can assign a novelty score of '0' to the content.

Filtering component 110 can also calculate cumulative novelty scores for content sources, including but not limited to news outlets and personal contacts on social media, over time. For example, a cumulative novelty score for a content source can be based on a ratio of new facts extracted from articles from that content source over new facts extracted from all content sources by filtering component 110 over a defined period of time. Cumulative novelty scores can also be based on, for example but without limitation, veracity based on the number of retweets or upvotes; the browsing habits of the user; user feedback regarding novelty, such as clicking a 'seen it' or 'learned something new' button; the nature of the source, such as a breaking news source that provides up-to-the-minute information, a source that provides evergreen content such as cat videos, or an aggregator source that only repeats information available elsewhere; and user input indicating a preference for a particular author. Filtering component 110 can use cumulative novelty scores to generate, for example, ratings and/or rankings of authors and/or other content sources.

Filtering component 110 uses the individual and relative novelty scores of incoming content and/or the cumulative novelty scores of content sources to display, suppress, and/or prioritize (or, generally, "filter") incoming content. For example but without limitation, filtering component 110 can determine that incoming content with a high novelty score can be displayed to the user via user interface 106; filtering component 110 can organize incoming content in a news feed based on the cumulative novelty scores of the content sources; and filtering component 110 can suppress incoming content with a novelty score of '0'. Suppressing content can include, for example but without limitation, hiding the content from view on user interface 106, or relegating the content to the end of a list of headlines displayed on user interface 106.

FIG. 2 is a flowchart 200 depicting operational steps of a personalized content filtering method, in accordance with an embodiment of the present invention.

In step 202, filtering component 110 monitors a user accessing content, extracts information from the content, and determines one or more story arcs based on the content. Filtering component 110 extracts, for example, entities, relationships, and facts from the content. Based on, for example, user input to computing device 104 indicating a story arc (e.g., "cute baby animals") or filtering component 110 identifying overlapping information in the content and the existing personal knowledge graph for an identified story arc, filtering component 110 determines a story arc that the user wishes to follow.

In step 204, filtering component 110 builds or modifies one or more personal knowledge graphs for the one or more story arcs based on the extracted information. For example, filtering component 110 builds a new personal knowledge graph, to be stored in knowledge store 114, for a newly identified story arc, or filtering component 110 adds relevant, new information extracted from the content to a personal knowledge graph that already exists in knowledge store 114 for a previously identified story arc. New information can be, for example, an entity, relationship, or fact extracted from the content that is not already represented in the personal knowledge graph.

In step 206, filtering component 110 receives new content and determines that the user has not accessed the content. New content can be, for example, a headline or a tweet that has not yet appeared on user interface 106.

In step 208, filtering component 110 determines a novelty score for the new content based on prospective changes, due to addition of information extracted from the new content, to the user's personal knowledge graph(s). For example, based on a comparison of one or more personal knowledge graphs stored in knowledge store 114 to one or more prospective knowledge graphs based on the addition of entities, relationships, and facts extracted from the new content, filtering component 110 determines a novelty score for the new content.

In step 210, filtering component 110 displays or suppresses the new content based on the novelty score determined in step 208 and/or a cumulative novelty score. For example, based on a low novelty score, filtering component 110 can relegate the new content to the end of a list of headlines displayed on user interface 106, or based on a high cumulative novelty score, filtering component 110 can prioritize the new content, organizing the list in such a way that the new content appears toward the top of the list.

In step 212, filtering component 110 updates one or more cumulative novelty scores based on the novelty score determined in step 208. For example, filtering component 110 can update the cumulative novelty score of an author of the content and the cumulative novelty score of a news outlet that provided that content.

Figure 3A:
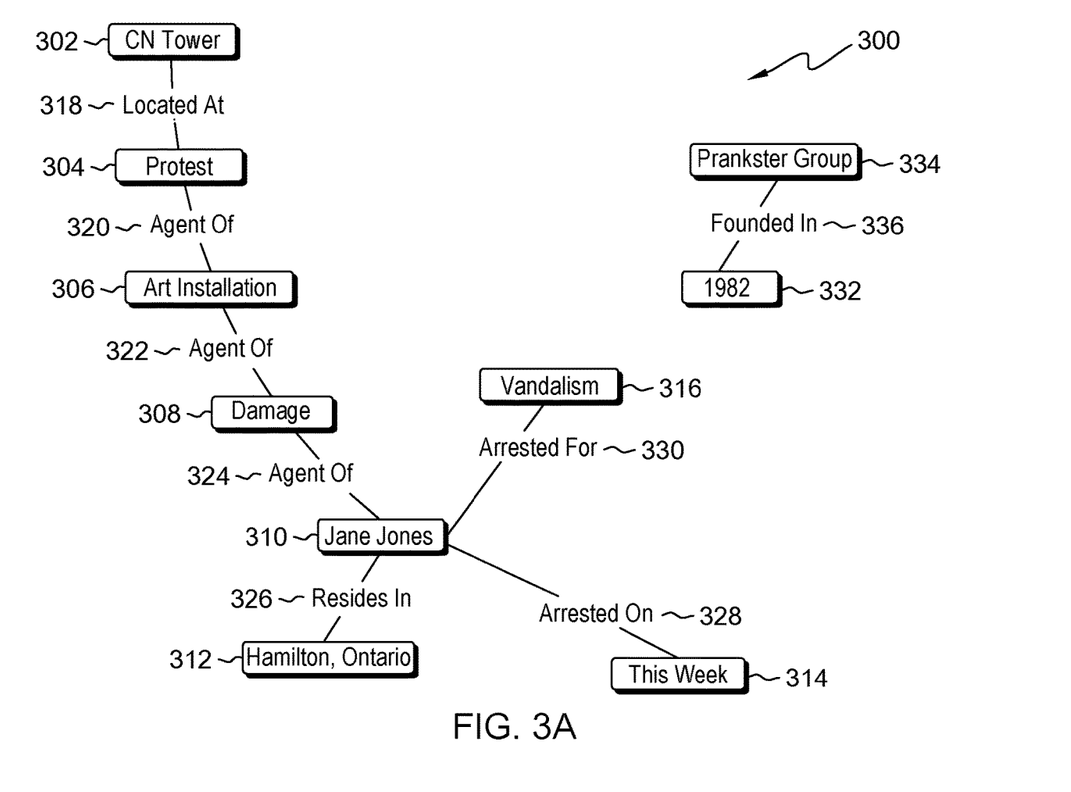
FIG. 3A-C shows exemplary knowledge graphs, in accordance with an embodiment of the present invention.
Figure 3B:
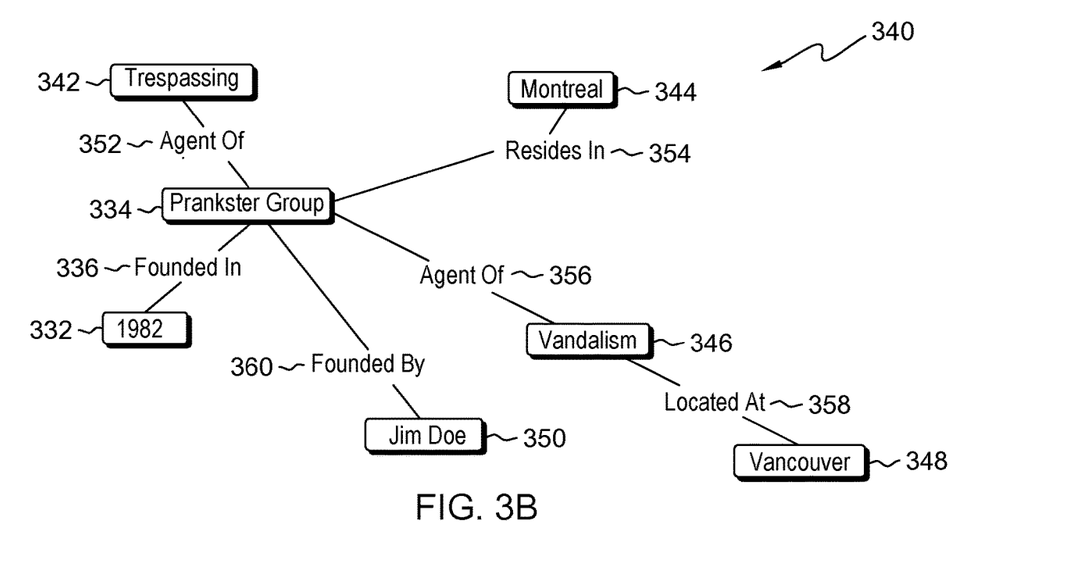
Figure 3C:
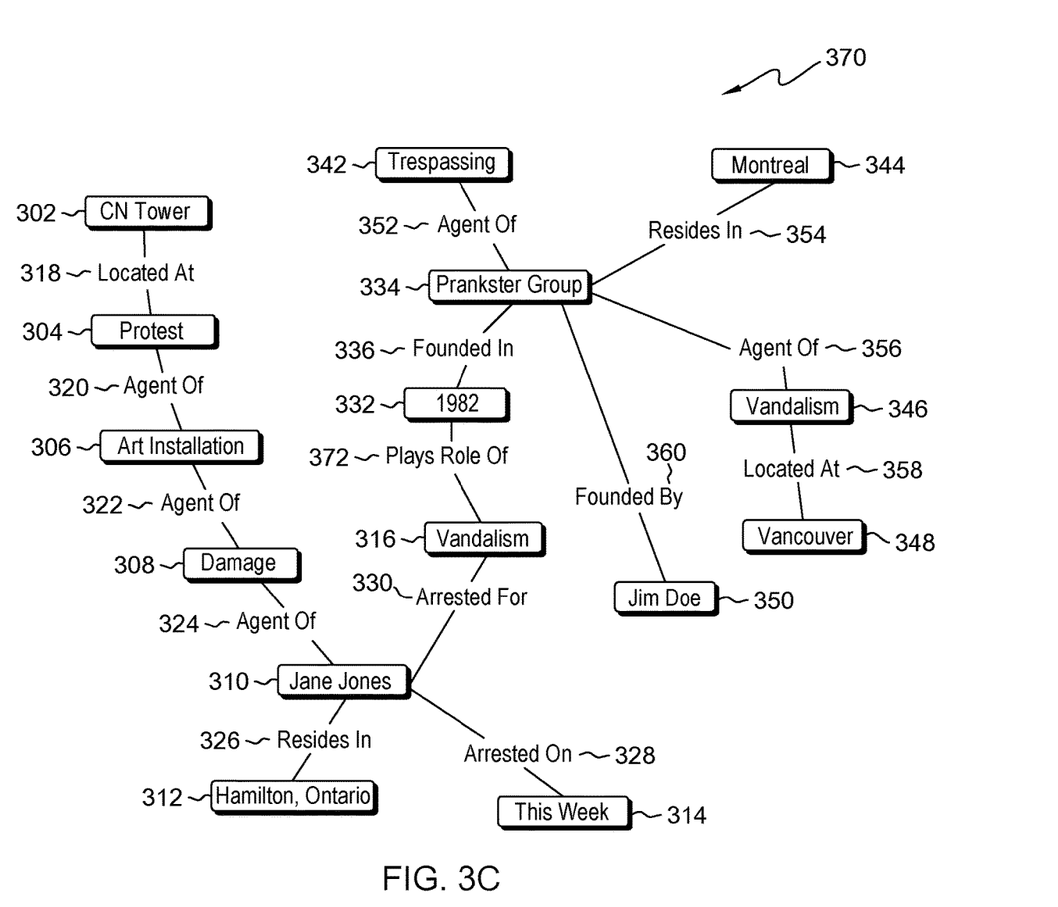

FIG. 3A-C shows examples of knowledge graphs that can be stored in knowledge store 114 and accessed and modified by filtering component 110, in accordance with an exemplary embodiment of the present invention. The example in FIG. 3A-C follows story arcs related to a fictitious event in Toronto, Ontario, used here for the purpose of illustration, from the perspective of a hypothetical user, named John, of computing device 104.

FIG. 3A shows John's personal knowledge graph, referred to herein as preliminary knowledge graph 300 (FIG. 3A), after accessing a first article concerning the arrest of Jane Jones, a member of the internationally famous Prankster Group, for vandalism at the CN Tower in Toronto. Preliminary knowledge graph 300 shows the entities and relationships related to Jane Jones and the Prankster Group and extracted by filtering component 110 from the first article. The first article (not shown) states that "Jane Jones, a Hamilton-based member of the Prankster Group, was arrested this week for vandalism at the CN Tower, having caused damage to property in the process of putting up an art installation intended as an act of protest." Nodes 302-316 of preliminary knowledge graph 300 represent entities (e.g., "Jane Jones," "CN Tower") and connections 318-330 represent relationships between nodes 302-316 (e.g., "Agent Of," "Resides In") related to Jane Jones. Nodes 332-334 represent facts and entities related to the Prankster Group, and connection 336 represents a relationship between node 332 and node 334.

FIG. 3B shows prospective knowledge graph 340 constructed by filtering component 110 upon arrival of a second article (not shown), for comparison with preliminary knowledge graph 300 (not shown) in order to determine a novelty score for the second article. The second article contains information that was not included in the first article, such as previous acts that the Prankster Group committed in Vancouver. Nodes 342-350 represent the new entities extracted from the second article and connections 352-360 represent relationships between nodes 342-350. Prospective knowledge graph 340 does not replace preliminary knowledge graph 300 as John's personal knowledge graph unless John accesses the second article.

FIG. 3C shows prospective knowledge graph 370 constructed by filtering component 110 upon arrival of a third article (not shown). In this example, John has accessed the second article, and prospective knowledge graph 340 has replaced preliminary knowledge graph 300 as John's personal knowledge graph. Connection 372 represents a relationship that was not included in the first and second articles. Filtering component 110 uses prospective knowledge graph 370 for the purpose of determining the novelty of the third article. Prospective knowledge graph 370 does not become John's personal knowledge graph unless John accesses the third article.

Figure 4:
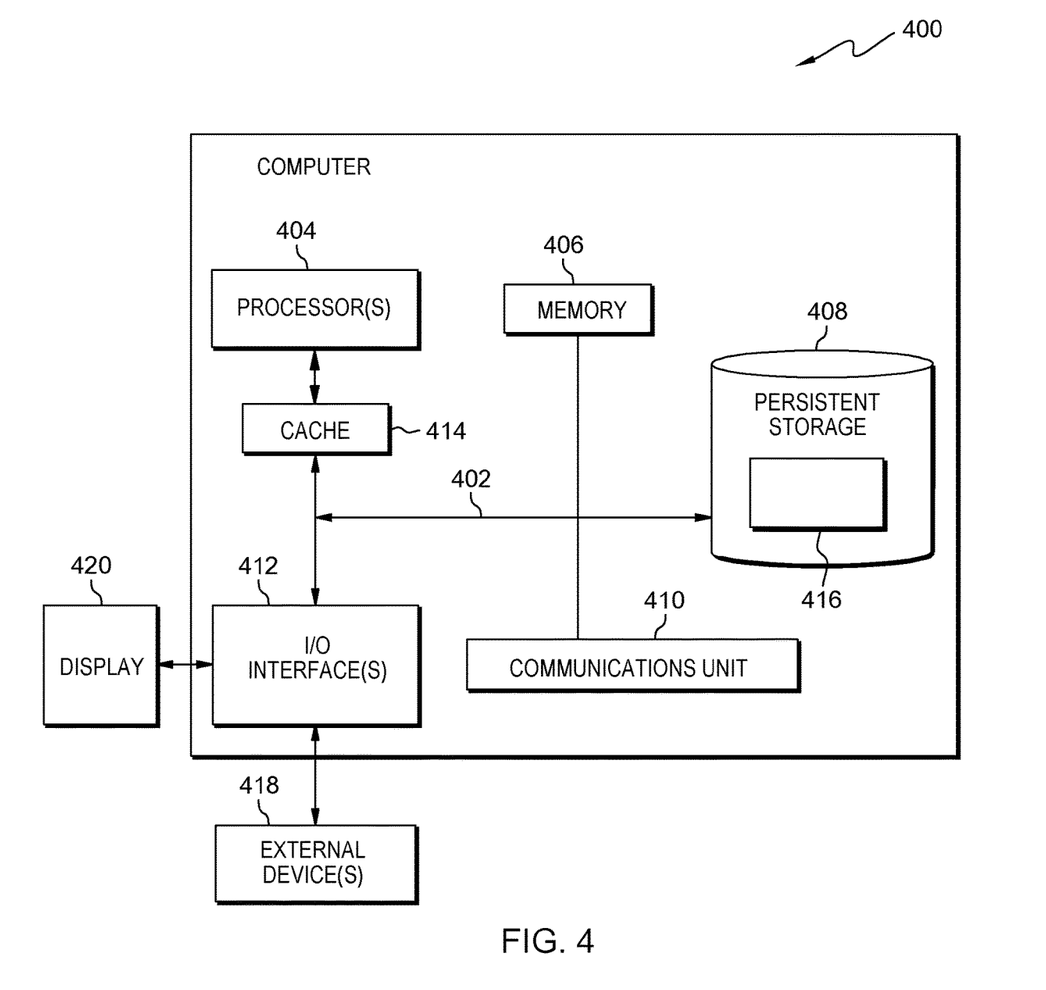
FIG. 4 is a block diagram of components of the computing device in FIG. 1 executing a personalized content filtering program, in accordance with an embodiment of the present invention.

FIG. 4 depicts a block diagram 400 of components of computing device 104 in computing environment 100, in accordance with illustrative embodiments of the present invention. It should be appreciated that FIG. 4 provides only an illustration of one implementation and does not imply any limitations with regard to the environments in which different embodiments may be implemented. Many modifications to the depicted environment may be made.

Computing device 104 includes communications fabric 402, which provides communications between computer processor(s) 404, memory 406, persistent storage 408, communications unit 410, and input/output (I/O) interface(s) 412, and cache 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) and cache memory 414. In general, memory 406 can include any suitable volatile or non-volatile computer readable storage media. Cache 414 is a fast memory that enhances the performance of computer processor(s) 404 by holding recently accessed data, and data near accessed data, from memory 406.

Program instructions and data used to practice embodiments of the invention, referred to collectively as component (s) 416, are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive can be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. Communications unit 410 can include one or more network interface cards. Communications unit 410 can provide communications through the use of either or both physical and wireless communications links. Component(s) 416 can be downloaded to persistent storage 408 through communications unit 410.

I/O interface(s) 412 allows for input and output of data with other devices that may be connected to computing device 104. For example, I/O interface 412 can provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., component(s) 416, can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a touchscreen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for personalized content filtering, the method comprising:
   determining, by the one or more computer processors, a first story arc based on a first piece of content;
   creating, by the one or more computer processors, a personal knowledge graph, of only the user, representing the user's individual knowledge related to the first story arc;
   determining, by the one or more computer processors, responsive to receiving a second piece of content, wherein the second piece of content has not been accessed by the user, a second story arc based on the second piece of content;
   determining, by the one or more computer processors, that the user has accessed the second piece of content;
   updating, by the one or more computer processors, the personal knowledge graph based on the second piece of content, wherein the first piece of content and the second piece of content share a third story arc, or determining a second personal knowledge graph based on the second story arc;
   determining, by the one or more computer processors, which information in the second piece of content the user has consumed;
   determining, by the one or more computer processors, a novelty score for the second piece of content based on the personal knowledge graph; and
   filtering, by the one or more computer processors, the second piece of content based on the novelty score and the user posting a link to the content elsewhere online.

2. The computer-implemented method of claim 1, wherein the personal knowledge graph comprises entities, relationships, and facts extracted from accessed content.

3. The computer-implemented method of claim 1, wherein the novelty score is based on the existence of one or more entities, relationships, and facts extracted from the second piece of content and not represented in the personal knowledge graph.

4. The computer-implemented method of claim 1, wherein filtering comprises one of hiding the second piece of content, prioritizing the second piece of content, and deprioritizing the second piece of content.

5. The computer-implemented method of claim 1, further comprising:
determining or updating, by the one or more computer processors, a cumulative novelty score for a content source based on the determined novelty score.

6. The computer-implemented method of claim 1, wherein the filtering is further based on the user posting links associated with the portions of the second piece of content to other locations online.

7. The computer-implemented method of claim 1, wherein the filtering is further based on at least one of portions of the second piece of content displayed to the user, eye tracking data associated with the user viewing the portions of the second piece of content, user manual selection of the portions of the second piece of content or time the user spent reading the portions of the second piece of content exceeding a predefined threshold.

8. A computer program product for personalized content filtering, the computer program product comprising:
one or more non-transitory computer readable storage media and program instructions stored on the one or more non-transitory computer readable storage media, the program instructions comprising:
program instructions to determine a first story arc based on a first piece of content;
program instructions to create a personal knowledge graph, of only the user, representing the user's individual knowledge related to the first story arc;
program instructions to determine, responsive to receiving a second piece of content, wherein the second piece of content has not been accessed by the user, a second story arc based on the second piece of content;
program instructions to determine that the user has accessed the second piece of content;
program instructions to update the personal knowledge graph based on the second piece of content, wherein the first piece of content and the second piece of content share a third story arc, or determining a second personal knowledge graph based on the second story arc;
program instructions to determine which information in the second piece of content the user has consumed;
program instructions to determine a novelty score for the second piece of content based on the personal knowledge graph;
program instructions to filter the second piece of content based on the personal knowledge graph; and
program instructions to filter the second piece of content based on the novelty score and the user posting a link to the content elsewhere online.

9. The computer program product of claim 8, wherein the personal knowledge graph comprises entities, relationships, and facts extracted from accessed content.

10. The computer program product of claim 8, wherein the novelty score is based on the existence of one or more entities, relationships, and facts extracted from the second piece of content and not represented in the personal knowledge graph.

11. The computer program product of claim 8, wherein filtering comprises at least one of hiding the second piece of content, prioritizing the second piece of content or deprioritizing the second piece of content.

12. The computer program product of claim 8, further comprising:
program instructions to determine or update a cumulative novelty score for a content source based on the determined novelty score.

13. The computer program product of claim 8, wherein the filtering is further based on the user posting links associated with the portions of the second piece of content to other locations online.

14. The computer program product of claim 8, wherein the filtering is further based on at least one of portions of the second piece of content displayed to the user, eye tracking data associated with the user viewing the portions of the second piece of content, user manual selection of the portions of the second piece of content or time the user spent reading the portions of the second piece of content exceeding a predefined threshold.

15. A computer system for personalized content filtering, the computer system comprising:
one or more processors;
one or more computer readable storage media; and
program instructions stored on the one or more computer readable storage media for execution by at least one of the one or more processors, the program instructions comprising:
program instructions to determine a first story arc based on a first piece of content;
program instructions to create a personal knowledge graph, of only the user, representing the user's individual knowledge related to the first story arc;
program instructions to determine, responsive to receiving a second piece of content, wherein the second piece of content has not been accessed by the user, a second story arc based on the second piece of content;
program instructions to determine that the user has accessed the second piece of content;
program instructions to update the personal knowledge graph based on the second piece of content, wherein the first piece of content and the second piece of content share a third story arc, or determining a second personal knowledge graph based on the second story arc;
program instructions to determine which information in the second piece of content the user has consumed;
program instructions to determine a novelty score for the second piece of content based on the personal knowledge graph;
program instructions to filter the second piece of content based on the personal knowledge graph; and
program instructions to filter the second piece of content based on the novelty score and the user posting a link to the content elsewhere online.

16. The computer system of claim 15, wherein the personal knowledge graph comprises entities, relationships, and facts extracted from accessed content.

17. The computer system of claim 15, wherein the novelty score is based on the existence of one or more entities, relationships, and facts extracted from the second piece of content and not represented in the personal knowledge graph.

18. The computer system of claim 15, wherein filtering comprises one of hiding the second piece of content, prioritizing the second piece of content, and deprioritizing the second piece of content.

19. The computer system of claim 15, further comprising:
   program instructions to determine or update a cumulative novelty score for a content source based on the determined novelty score.

20. The computer system of claim 15, wherein the filtering is further based on the user posting links associated with the portions of the second piece of content to other locations online and at least one of portions of the second piece of content displayed to the user, eye tracking data associated with the user viewing the portions of the second piece of content, user manual selection of the portions of the second piece of content or time the user spent reading the portions of the second piece of content exceeding a predefined threshold.

\* \* \* \* \*